C. C. A. E. WIESE.
DEVICE FOR THE INTERRUPTION OF THE PROJECTION OF KINEMATOGRAPHIC PICTURES.
APPLICATION FILED MAR. 17, 1914.
1,120,577.  Patented Dec. 8, 1914.
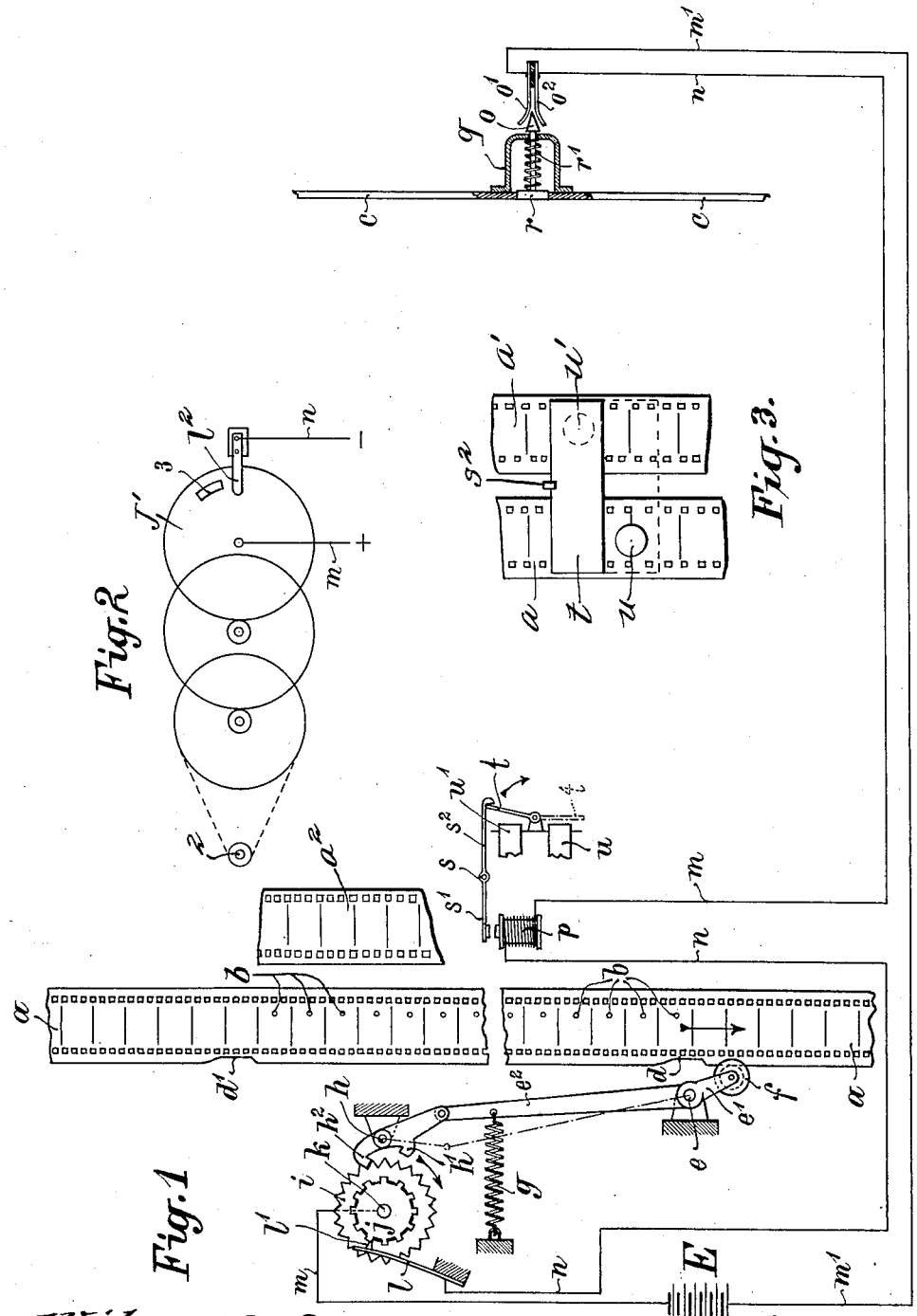

UNITED STATES PATENT OFFICE.

CONRAD CARL ARTHUR EDWIEN WIESE, OF HAMBURG, GERMANY.

DEVICE FOR THE INTERRUPTION OF THE PROJECTION OF KINEMATOGRAPHIC PICTURES.

1,120,577.

Specification of Letters Patent.

Patented Dec. 8, 1914.

Application filed March 17, 1914. Serial No. 825,397.

*To all whom it may concern:*

Be it known that I, CONRAD CARL ARTHUR EDWIEN WIESE, electrical engineer, a subject of the German Emperor, residing at No. 24 Maxstrasse, Hamburg, Germany, have invented new and useful Improvements in or Relating to a Device for the Interruption of the Projection of Kinematographic Pictures, of which the following is a specification.

This invention relates to the projection of moving pictures upon a screen.

More especially the invention relates to the projection of moving pictures wherein, at certain predetermined times, a target of desired pictorial characteristics may be exposed upon the screen at a predetermined point, the screen being provided at that point with a depressible portion arranged to actuate a circuit closer so that when the target is struck at the proper point a second series of pictures will be displayed upon the screen, the target, as such, disappearing from the screen. For instance at a predetermined time in the projection a deer may be displayed as advancing or retreating from a certain part of the screen. The marksman, standing at a distance from the screen fires at the deer. If his bullet strikes the animal the running deer will disappear from the screen by reason of the projection of the film containing the representation of a running deer being shut off from the screen and a second film may be exhibited showing the deer in the act of falling.

The object of the present invention is to provide an improved mechanism which will permit such operation.

Another object of the invention is to provide means whereby operation of the depressed portion of the screen will not effect the transfer of the projection from the first to the second set of pictures except at the time that the target picture is projected so that if the screen be shot at at a time when the target picture is not projected thereon and the shot strikes the depressible portion of the screen it will not have the effect of closing the circuit.

With the above and other objects in view the invention consists in general of certain novel details of construction and combination of parts hereinafter fully described, illustrated in the accompanying drawings, and specifically claimed.

In the accompanying drawings, like characters of reference indicate like parts in the several views, and:—Figure 1 is a diagrammatic view of a portion of a projection apparatus showing the improvement herein described but omitting all unnecessary parts. Fig. 2 is a modification of certain parts of the apparatus illustrated diagrammatically. Fig. 3 is a diagrammatic view showing the relative positions of the films, objectives and shutter, the view being merely typical of a suitable arrangement for this purpose.

In carrying out the objects of the invention there is disclosed in the present showing a film $a$ provided with the usual successive pictures but certain of these pictures are provided with special target markings as indicated at $b$. These target markings may be of various styles, as for instance they may be perforated so that an extremely bright spot may be thrown on the screen for any period of time necessary to run the section of film containing such markings through the machine; it may be a spot produced by elimination of the emulsion or by coloring the same or in any other desired manner. The projection of this portion of the picture on the screen indicates the striking point for the projectile.

In order to operate the apparatus a certain electrical circuit is employed, hereinafter to be explained, and in order to close a break in this circuit at the time that the range of target pictures is being projected and to operate this break as soon as the range is completed a circuit closer, now to be described is employed. In the form shown in Fig. 1 the film $a$ is provided in one of the edges with recessed portions $d$ and $d'$. In a suitable bracket is supported a pivot point $e$ whereon is mounted a lever having arms $e'$ and $e^2$. On the arm $e'$ is mounted a roller $f$ which engages the edge of the film $a$, being constantly held in contact with said film by a spring $g$ attached to the lever arm $e^2$ so that when the recessed portions $d$ and $d'$ come opposite the roller $f$ the lever will move.

At $h$ is a pivot pin whereto is provided an anchor having the pallets $h'$ and $h^2$ and this anchor is connected to the lever arm $e^2$ so that as the lever is operated the anchor will likewise be operated.

At $k$ is a shaft whereon is mounted a ratchet wheel $i$ arranged for engagement by the anchor so that as the anchor moves from one position to the other the ratchet wheel will be advanced one tooth. On this shaft $k$ is also mounted a contact wheel $j$ having alternate insulating and contact portions on its surface. This wheel $j$ is arranged to rotate with the wheel $i$ and it is engaged by a contact $l'$ mounted on a spring contact arm $l$. Now as the roller $f$ passes into the recess $d$ the anchor will operate and turn the wheel $i$ and cause the contact member $l'$ to rest on a contact portion of the wheel $j$. When the recess $d'$ reaches the roller $f$ the anchor will again operate to bring the member $l'$ on an insulating portion of the wheel $j$.

In the form of the device shown in Fig. 2 there is disclosed a crank or motor shaft 2 which is connected through a train of wheels to a wheel $j'$ arranged to revolve once during the whole length of the movement of the film. On this wheel $j'$ is a contact member or projection 3 corresponding in length to the length of the range of pictures of the film showing the target $b$ and so positioned on the wheel that a spring contact $l^2$ will engage therewith during the period of such projection.

The picture screen $c$ is provided with a suitable opening for the reception of a plunger head $r$ having a stem supported in a bracket $q$ and normally held flush with the surface of the screen $c$ by means of a spring $r'$. This portion $r$ is a portion of the screen whereon the target picture is projected, by target picture it is to be understood that there is meant the portion $b$ of the picture. Behind the bracket $q$ is suitably supported a pair of spring contact members $o'$ and $o^2$ while the stem of the plunger carries a contact wedge $o$ which moves into engagement momentarily with the member $o'$ and $o^2$ when the plunger head $r$ is depressed when struck by a projectile. Leading from the shaft $k$ is a wire $m$ which extends to a battery E or other source of electrical energy. This battery is connected by means of a wire $m'$ with the contact member $o'$ while the contact member $o^2$ is connected by a wire $n$ with the contact arm $l$, a magnet $p$ being interposed in this wire.

At $u$ and $u'$ are a pair of objectives, the picture from the film $a$ being projected through the objective $u$ while the objective $u'$ is used to project a second series of pictures from a second film. The objective $u'$ is normally shut off from the screen by a shutter $t$ which is engaged by a hook in one arm $s^2$ of a lever which is pivoted at $s$ intermediate its ends. The remaining arm of this lever, $s'$, is provided with a suitable armature for the magnet $p$, so that when the magnet is energized the lever will release the shutter $t$ and allow the same to drop and cover the objective $u$ and uncover the objective $u'$.

In the operation of the device, as a whole, when the point of the film $a$ containing the target picture arrives opposite the objective, $u$, the circuit closer operated by the film will be closed. The target picture will then be projected on the plunger head $r$ and may be fired at with any desired weapon. Upon the plunger head being struck, circuit is closed between the members $o'$ and $o^2$ which completes the entire circuit through the magnet $p$. The shutter thereupon drops and the target picture disappears from the screen being replaced by the second set $a^2$ of pictures. To use the example before referred to, a running deer projected on the plunger head $r$ may be cut off and a second set of pictures representing the deer falling down takes the place thereof, showing the marksman that he has made a hit.

It will be understood that the above is merely cited as one of many target pictures that will be used.

It will be obvious that in connection with this apparatus there may be cut into the circuit any desired means, of the character common in apparatus of this class for stopping the film $a$ and starting the second set of pictures or otherwise manipulate the two sets as desired. This projecting arrangement forms no part of the invention and is, therefore, not herein illustrated.

It will also be understood that any number of plunger heads $r$ may be disposed in desired position on the screen so that more than one portion of the projected picture may be used as a target.

Having thus described the invention, what is claimed as new, is:—

1. In a device of the class described, a film operated circuit closer, a screen having a depressible portion, a second circuit closer operated by the depression of the screen portion, an objective, a shutter for said objective, electro-magnetic means controlling said shutter, and a battery, said battery, circuit closers and electro-magnetic means being connected in series.

2. The combination with a screen having a depressible portion; of a pair of objectives, a shutter normally holding one objective closed and the other open, electro-magnetic means for releasing said shutter to open the first and close the second objective, and a circuit closer actuated by the depression of the screen portion and connected in series to said electro-magnetic means.

3. The combination with a film having a recess in one edge, of a lever having an end engaging said edge and adapted to enter said recess, a spring holding said lever in said engagement, and a step by step circuit closer operable by oscillation of the lever.

4. The combination with a film having a recess in one edge, of a lever having an end engaging said edge and adapted to enter said recess, a spring holding said lever in said engagement, an anchor pawl connected to said lever, a ratchet wheel engaged by said pawl for operation by the movement of the pawl, a contact wheel having alternate contact and insulating portions and movable with said ratchet wheel, and a contact engaging said wheel.

In testimony whereof I have signed my name to this specification in the presence of two subscribing witnesses, this 21 day of February 1914.

CONRAD CARL ARTHUR EDWIEN WIESE.

Witnesses:
F. JULIUS TOSHS,
ERNEST H. L. MUMMENHOFF.